US012404994B2

(12) United States Patent
Huijgen et al.

(10) Patent No.: US 12,404,994 B2
(45) Date of Patent: Sep. 2, 2025

(54) DIRECTIONAL LIGHTING DEVICE

(71) Applicant: SIGNIFY HOLDING B.V., Eindhoven (NL)

(72) Inventors: Jaap Huijgen, Rotterdam (NL); Odin Visser, Rotterdam (NL); Jeffrey Huyghe, Heule (BE); Frederik Andre' Martin Vanslambrouck, Oostrozebeke (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/703,461

(22) PCT Filed: Oct. 24, 2022

(86) PCT No.: PCT/EP2022/079568
§ 371 (c)(1),
(2) Date: Apr. 22, 2024

(87) PCT Pub. No.: WO2023/072821
PCT Pub. Date: May 4, 2023

(65) Prior Publication Data
US 2025/0237372 A1 Jul. 24, 2025

(30) Foreign Application Priority Data
Oct. 28, 2021 (EP) .................................... 21205255

(51) Int. Cl.
*F21V 23/00* (2015.01)
*F21S 8/00* (2006.01)
*F21V 15/01* (2006.01)
*F21V 21/30* (2006.01)

(52) U.S. Cl.
CPC .............. *F21V 23/002* (2013.01); *F21S 8/03* (2013.01); *F21V 15/01* (2013.01); *F21V 21/30* (2013.01)

(58) Field of Classification Search
CPC ........ F21S 8/03–038; F21V 15/01–015; F21V 21/30; F21V 23/001–002
See application file for complete search history.

(56) References Cited

U.S. PATENT DOCUMENTS 1,927,703 A 9/1933 Glowacki
4,258,414 A 3/1981 Sokol
4,700,017 A 10/1987 Morand
8,733,988 B2 * 5/2014 Huang ...................... F21K 9/23 362/372

(Continued)

FOREIGN PATENT DOCUMENTS

CN 102418868 A 4/2012
DE 2538668 A1 5/1976
DE 3411976 A1 10/1985

*Primary Examiner* — Jason M Han

(57) ABSTRACT

The disclosure proposes an improved directional lighting device (10) comprising a supporting structure (11); a ball-joint structure (12) mounted to the supporting structure (11); a housing (13) configured to accommodate a light emitting source (14); electric wiring (15) fed from the supporting structure (11) through the ball-joint structure (12) and electrically connecting the light emitting source (14); the ball-joint structure (12) configured to direct the housing (13) relative to the supporting structure (11) and the light emitting source (14).

7 Claims, 4 Drawing Sheets

(56) References Cited

U.S. PATENT DOCUMENTS

| | | | |
|---|---|---|---|
| 2004/0037064 | A1 | 2/2004 | Johnson |
| 2013/0182437 | A1 | 7/2013 | Sachsenweger |
| 2017/0269460 | A1 | 9/2017 | Fagerkvist |

* cited by examiner

DIRECTIONAL LIGHTING DEVICE

CROSS-REFERENCE TO PRIOR APPLICATIONS

This application is the U.S. National Phase application under 35 U.S.C. § 371 of International Application No. PCT/EP2022/079568, filed on Oct. 24, 2022, which claims the benefit of European Patent Application No. 21205255.9, filed on Oct. 28, 2021. These applications are hereby incorporated by reference herein.

TECHNICAL FIELD

The present disclosure relates to a lighting device with a directional lighting housing.

BACKGROUND OF THE INVENTION

Directional lighting devices are commonly known in several configurations for illuminating spaces in home and office environments. In general, such directional lighting devices have a supporting structure for mounting to a wall surface or ceiling surface and a lamp housing in which a light emitting source is accommodated. The lamp housing is connected to the supporting structure by means of a ball joint rotation system. Electric wiring is fed through the supporting structure, through the ball joint rotation system electrically connected with the light emitting source. The electric wiring at the supporting structure side is subsequently electrically connected with the power mains of the home and office environment.

Several configurations employs power circuitry (power electronics) either in supporting structure or on the lamp housing. For directing the light beam of the lighting device, the ball joint rotation system allows the lamp housing with the light emitting source to be rotated in all directions around the ball surface of the ball joint. Continuous rotation around 360° causes twisting of the electric wiring, ultimately leading to rupture, malfunction and potential hazard due to electrical short circuit.

Accordingly, it is a goal of the present disclosure to improve the presently known directional lighting devices to the extent that the improved configuration does not suffer from undesired twisting of the electric wiring when the housing is rotated around 360° multiple times and thus is not prone to rupture and potential electrical hazards.

SUMMARY OF THE INVENTION

According to a first example of the disclosure, a directional lighting device is proposed, which comprises a supporting structure; a ball-joint structure mounted to the supporting structure; a housing configured to accommodate a light emitting source; electric wiring fed from the supporting structure through the ball-joint structure and electrically connecting the light emitting source; and wherein the ball-joint structure configured to direct the housing relative to the supporting structure and the light emitting source. As the lamp housing can be rotated in all directions around the ball surface of the ball joint structure relative to the supporting structure and the light emitting source no undesired twisting of the electric wiring occurs. Accordingly, the electric wiring within the lamp housing will not rupture and potential hazards, such as electric short-circuit is avoided.

According to the disclosure, the light emitting source is mounted to a mounting plate, wherein the mounting plate has an outer dimension which is smaller than the inner dimension of the housing. In a particular example, the mounting plate is retained within the housing by means of a retaining spring element, which fits in a circumferential slot provided at the inner circumferential surface of the housing. As the light emitting source is kept stationary relative to the lamp housing, the latter rotation and directing in all directions around the ball surface of the ball joint structure does not twist the electric wire and accordingly any wire rupture is prevented.

To further improve the positioning of the lamp housing relative to the ball-joint structure, a cup-shaped tensioning element having an outer dimension which is smaller than the inner dimension of the housing is clamped between the ball-joint structure and the mounting plate. The clamping of the cup-shaped tensioning element on the ball surface of the ball-joint structure is effected by the retaining spring element fitted in the circumferential slot provided in the inner circumferential surface of the housing. The clamping maintains a constant tension on the ball joint, and accordingly allows the lamp housing to be kept in the chosen position relative to the supporting structure.

In a preferred example, the housing is configured as an elongated hollow tube with one tube end being mounted to the ball-joint structure. In particular, a bearing ring is mounted between the ball joint structure and the inner surface of the one tube end. Herewith the lamp housing can be directed and rotated properly in all directions relative the supporting structure and the light emitting source, without any risk of unwanted wire twisting and wire rupture.

By mounting a tensioning spring between the cup-shaped tensioning element and the mounting plate the clamping can be maintained whilst allowing rotation and orientation of the lamp housing along the ball surface in any desired position.

In particular, the cup-shaped tensioning element is provided with a circumferential slit for accommodating the tensioning spring. Herewith a compact inner construction is obtained with limited risk for malfunction or blocking.

In order to properly accommodate the electric wiring within the lamp housing without any further risk of twisting or entrapment between the several component inside the lamp housing, a flexible wiring sleeve is used in which the electric wiring can be accommodated. Preferably, the flexible wiring sleeve has a first sleeve end which is loosely coupled with the ball-joint structure and a second sleeve end which is loosely coupled with the mounting plate. The loose coupling of the flexible wiring sleeve within the directional lighting device prevents any twisting or entrapment during the rotation and direction of the lamp housing relative to the supporting structure and the light emitting device accommodated inside the housing.

BRIEF DESCRIPTION OF THE DRAWINGS

The invention will now be discussed with reference to the drawings, which show in.

DETAILED DESCRIPTION OF THE INVENTION

Figure 1:
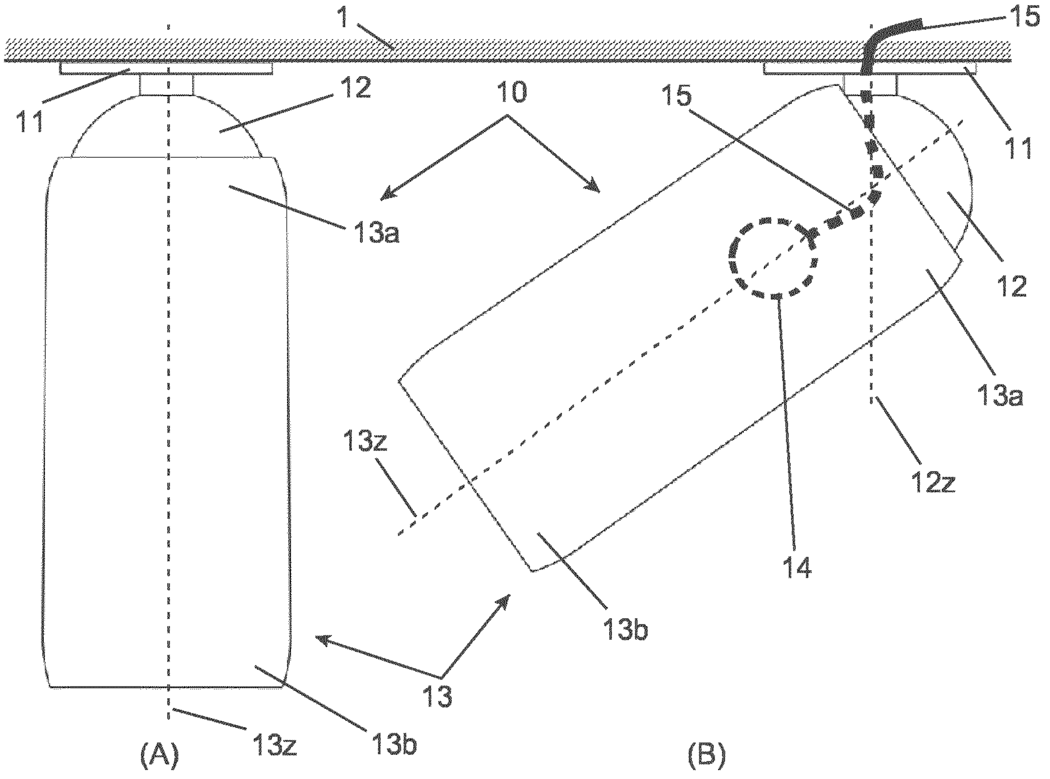
FIG. 1 side views of a non-exemplary example of a directional lighting device according to the disclosure.

For a proper understanding of the invention, in the detailed description below corresponding elements or parts of the invention will be denoted with identical reference numerals in the drawings.

Figure 2A:
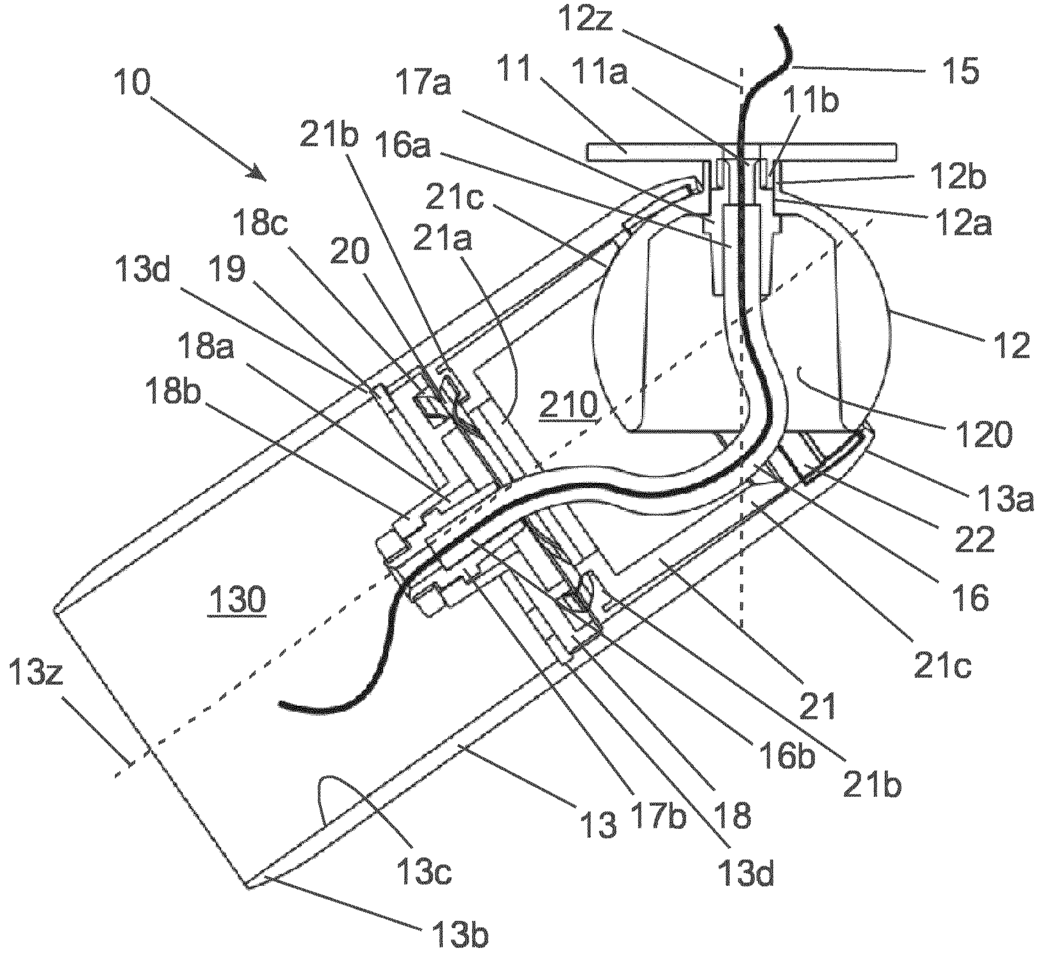
FIGS. 2*a* and 2*b* sectional views of a non-exemplary example of a directional lighting device according to the disclosure.
Figure 2B:
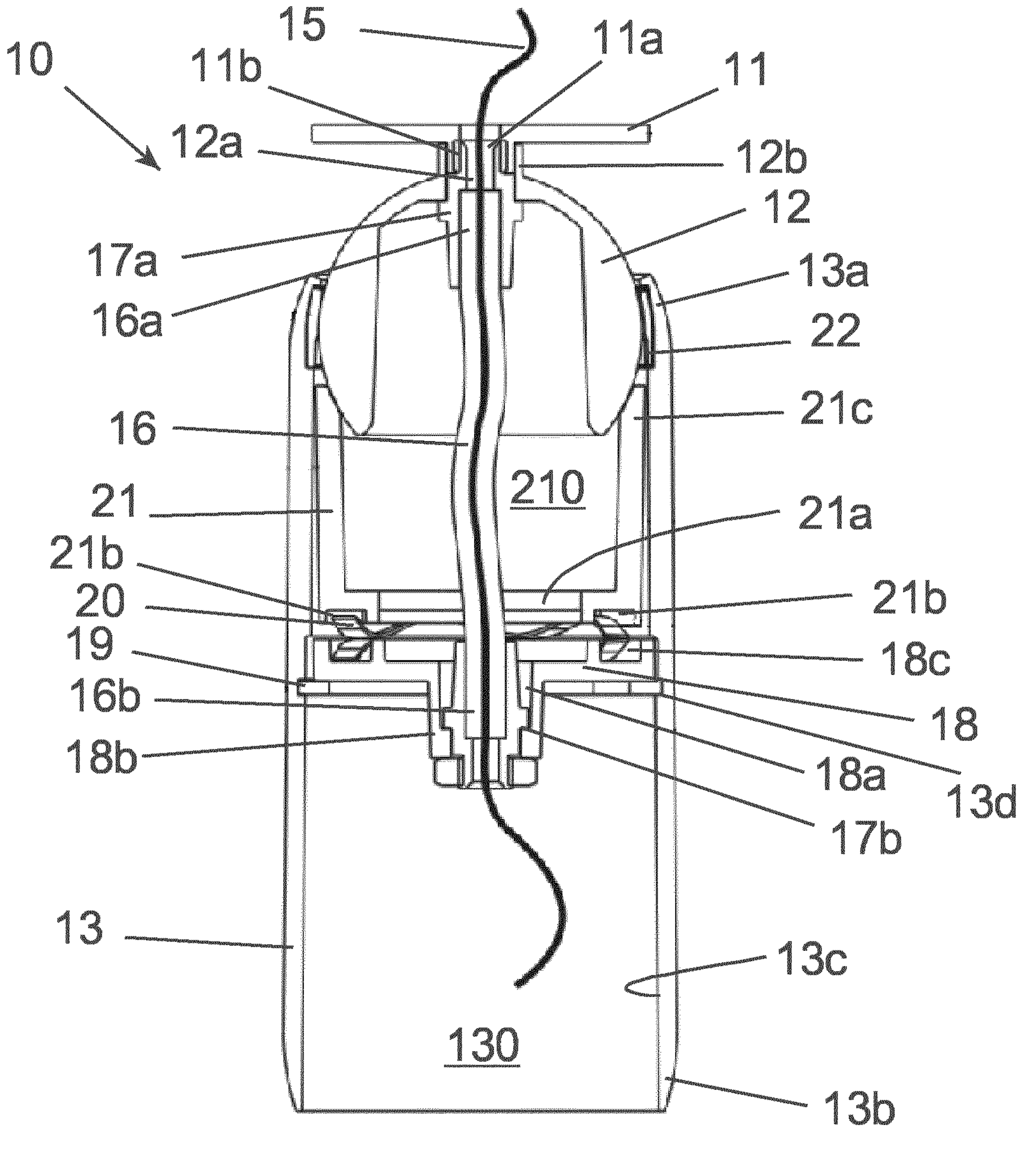
Figure 3:
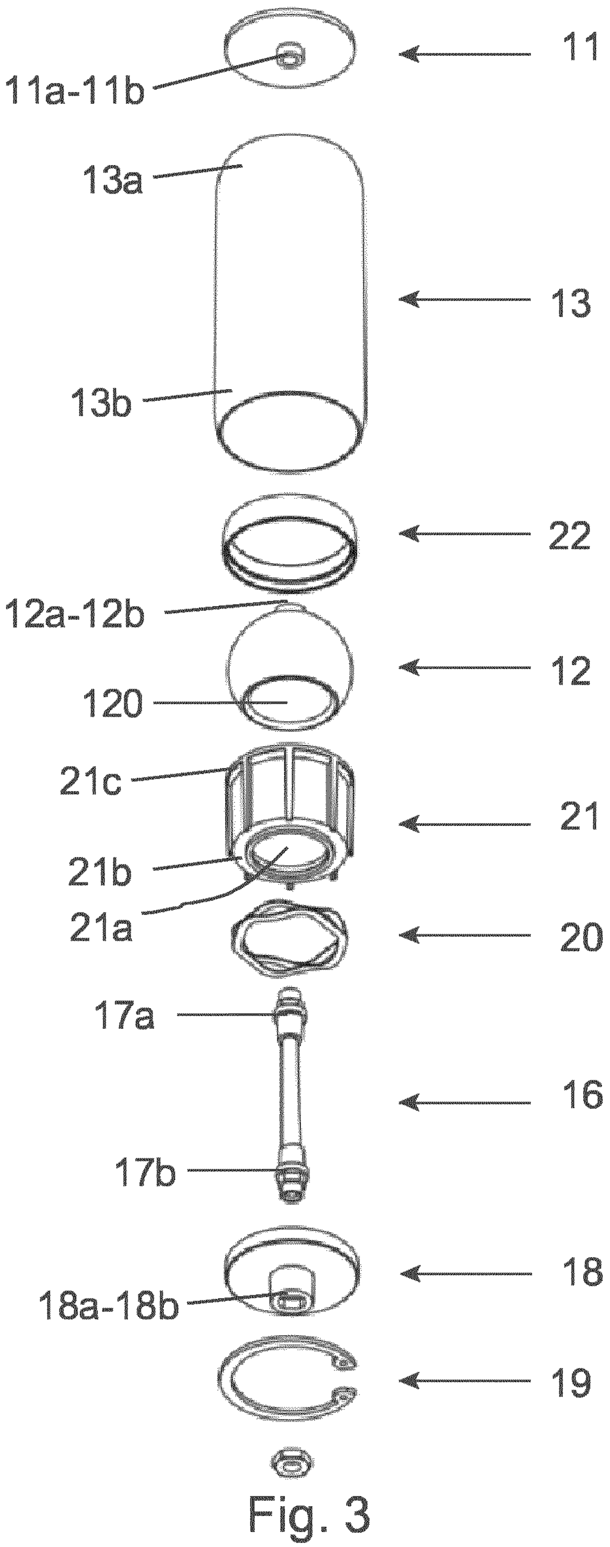
FIG. 3 a further detailed view of a non-exemplary example of a directional lighting device according to the disclosure.

FIG. 1 depicts side views of a non-exemplary example of a directional lighting device according to the disclosure. Proper sectional views of the directional lighting device are depicted in FIGS. 2*a*-2*b* and 3. The directional lighting device is denoted with reference numeral 10 and is composed of a supporting structure 11, a ball-joint structure 12 mounted to the supporting structure 11, a housing 13 configured to accommodate a light emitting source 14 and electric wiring 15. The electric wiring 15 is fed from the supporting structure 11 through the ball-joint structure 12 and is electrically connected with the light emitting source 14.

Such directional lighting device finds many applications for illuminating a spaces in home and office environments. In general, the supporting structure 11 is mounted to a wall surface 1 or ceiling surface 1 of the space to be illuminated using known construction materials. The electric wiring 15 at the supporting structure side is subsequently electrically connected with the power mains of the home or office environment.

As shown in the sectional views of FIGS. 2*a* and 2*b*, the electric wiring 15 is fed through suitable feedthrough openings 11*a* and 12*a* of either supporting structure 11 and ball-joint structure 12 before being electrically connected to the light emitting source 14. The supporting structure 11 is provided with a mounting flange 11*b* which interacts with a mounting flange 12*b* of the ball-joint structure 12. Reference numeral 12*z* denotes the main axis of ball-joint structure 12. The main axis 12*z* can be regarded as the source axis of the ball-joint structure 12 around which source axis the lamp housing 13 can be orientated and rotated around 360° relative to the supporting structure 11 (wall or ceiling surface 1).

In the state of the art directional lighting devices, continuous rotation around 360° causes twisting of the electric wiring, ultimately leading to rupture, malfunction and potential hazard due to electrical short circuit. The present disclosure provides an improved directional lighting device wherein the electric wiring 15 does not twist when the housing is rotated around 360° multiple times and according the electric wiring 15 is not prone to rupture and potential electrical hazards.

Accordingly, the ball-joint structure 12 is configured to direct the housing 13 relative to the supporting structure 11 and the light emitting source 14. As the lamp housing 13 can be rotated in all directions around the ball surface of the ball joint structure 12 relative to the supporting structure 11 and the light emitting source 14 no undesired twisting of the electric wiring 15 occurs. The light emitting source 14 is kept stationary relative to the lamp housing 13. Accordingly, the electric wiring 15 within the lamp housing 13 will not twist nor rupture and potential hazards, such as electric short-circuit is avoided.

As shown in the Figures, the housing 13 is shaped as an elongated hollow tube with one tube end 13*a*, serving as mounting end for mounting to the ball-joint structure 12. The other tube end 13*b* functions as light exit window and directs a light beam emitting by the light emitting source 15 along the longitudinal axis 13*z* of the tube-shaped lamp housing 13. The longitudinal axis 13*z* can be regarded as the destination axis of the ball-joint structure 12 as it is pointing towards the destination of the projected light beam exiting the light exit window 13*b*. For guaranteeing a proper mounting of the lamp tube housing 13 to the ball-joint structure 12 a bearing ring 22 is mounted between the ball joint structure 12 and the inner surface 13*c* of the tube end 13*a*. Accordingly, the lamp housing 13 can be directed and rotated properly in all directions relative the supporting structure 11 and the light emitting source 14, without any risk of unwanted wire twisting and wire rupture.

As stipulated, the configuration of the directional lighting device 10 according to the disclosure allows the light emitting source 14 to be kept stationary relative to the lamp housing 13. To this effect, the light emitting source 14 is mounted to a mounting plate denoted with reference numeral 18. The mounting plate 18 together with the light emitting source 14 are accommodated in the lamp housing 13, with the mounting plate 18 facing the ball-joint structure 12 and the light emitting source 14 facing or directing towards the light exit window 13*b* of the lamp housing 13.

The mounting plate 18 has an outer dimension which is conformal yet somewhat smaller than the inner dimension of the housing 13, thus allowing the positioning of the mounting plate 18 in the inner space 130 of the tube-shaped housing 13. In particular, the mounting plate 18 is loosely mounted inside the housing 13, wherein it is retained within the housing 13 by means of a retaining spring element 19. The retaining spring element 19 fits in a circumferential slot 13*d* provided in the inner circumferential surface 13*c* of the housing 13 and prevents the mounting plate 18 together with the light emitting source 14 from dislodging from the inner space 130 of the housing 13.

Accordingly, as the mounting plate 18 together with the light emitting source 14 are is loosely mounted inside the housing 13. In particular they are kept stationary relative to the lamp housing 13, the latter rotation and directing in all directions around the ball surface of the ball joint structure 12 does not twist the electric wire 15 and accordingly any wire rupture is prevented. Mounting plate 18 furthermore comprises a feedthrough opening 18*a* for the electric wiring 15, which is electrically connected to the light emitting source 15. Alternatively, power circuitry or power electronics (not depicted in the Figures) can be mounted (in the form of a PCB) to the mounting plate 18 and electrically connected with the electric wiring 15. In this alternative example, the light emitting source 15 is subsequently connected with and powered by the power electronics PCB.

The power circuitry or power electronics can also be mounted as a PCB inside the supporting structure 11.

Reference numeral 21 denotes a cup-shaped tensioning element, which is accommodated between the ball-joint structure 12 and the mounting plate 18. The cup-shaped tensioning element 21 has an outer dimension which is smaller than the inner dimension of the housing 13 allowing it to be accommodated inside the lamp housing 13. Due to the retaining spring element 19 being fitted in the circumferential slot 13*d* provided in the inner circumferential surface 13*c* of the housing 13, the mounting plate 18 together with the light emitting source 14 as well as the cup-shaped tensioning element 21 are accommodated in a clamped manner between the ball-joint surface 12 and the retaining spring element 19 and cannot dislodge from the inner space 130 of the housing 13.

The cup-shaped tensioning element 21 has an inner space 210 and a circumferential rim 21*c*, which abuts against the ball surface of the ball-joint structure 12. A feedthrough opening 21*a* is present in the cup-shaped tensioning element 21 that links with the inner space 210 to allow passage of the electric wiring 15 via the several feedthrough openings 11*a*-12*a* of the supporting structure 11 and the ball-joint structure 12 and via the feedthrough opening 18*a* towards the light emitting source 15.

The clamping of the cup-shaped tensioning element 21 with its rim 21*c* on the ball surface of the ball-joint structure 12 is effected by the retaining spring element 19. Additionally, a tensioning spring 20 is mounted between the cup-shaped tensioning element 21 and the mounting plate 18. Hereto, the cup-shaped tensioning element 21 is provided with a circumferential slit 21*b* for accommodating the tensioning spring 20. The slit 21*b* is provided at the side of the cup-shaped tensioning element 21 facing towards the light exit window 13*b* (or facing away from the ball-joint structure 12).

Similarly, the mounting plate 18 is provided with a circumferential slit 18*c* for accommodating the other side of the tensioning spring 20. The circumferential slit 18*c* of the mounting plate 18 is provided in the side of the mounting plate 18 facing towards the cup-shaped tensioning element 21 (or facing away from the light exit window 13*b*). Both circumferential slits 21*b* and 18*c* form a circumferential space enclosing the tensioning spring 20. Herewith a compact inner construction is obtained with limited risk for malfunction or blocking.

The mounting plate 18 and the cup-shaped tensioning element 21 are retained in the inner space 130 of the lamp housing 13 between the retaining spring element 19 and the ball-joint surface 12. This construction together with the tensioning spring 20 mounted between the mounting plate 18 and the cup-shaped tensioning element 21 guarantees that a certain constant tension is maintained on the ball joint structure 12. Accordingly, this construction allows the lamp housing 13 to be kept in the chosen position relative to the supporting structure 11, whilst allowing rotation and orientation of the lamp housing 13 along the ball surface of the ball-joint structure 12 in any desired position.

The assembly of the mounting plate 18 with the light emitting source 14, the tensioning spring 20 and the cup-shaped tensioning element 21 is loosely accommodated within and relative to the lamp housing 13 between the retaining spring element 19 and the ball-joint structure 12. The whole assembly of the parts 18(14)-20-21 can be kept stationary relative to the lamp housing 13, whilst the latter rotation and directing in all directions around the ball surface of the ball joint structure 12 does not cause any twisting of the electric wire 15. Accordingly any wire rupture is prevented.

The electric wiring 15 is properly accommodated within the lamp housing 13 with the use of a flexible wiring sleeve 16 made from a flexible, yet sturdy material. The electric wiring 15 is shielded inside the flexible wiring sleeve 16. The flexible wiring sleeve 16 has a first sleeve end 16*a* which is loosely coupled with the ball-joint structure 12 and a second sleeve end 16*b* which is loosely coupled with the mounting plate 18. In particular, each first and second sleeve end 16*a*-16*b* is provided with a coupling end 17*a* and 17*b* respectively, which is made from a sturdy, preferably plastic material.

Each coupling end 17*a*-17*b* has an outer dimension which is conformal to the inner dimension of the feedthrough opening 12*a* (18*a*) of the ball-joint structure 12 (mounting plate 18), respectively. In particular, each coupling end 17*a*-17*b* has a coupling surface that loosely interacts with either the inner surface of the mounting flange 12*b* surrounding the feedthrough opening 12*a* of the ball-joint structure 12 or the inner surface of the mounting flange 18*b* surrounding the feedthrough opening 18*a* of the mounting plate 18.

The loose coupling of the flexible wiring sleeve 16 (with the coupling ends 17*a*-17*b*) within the directional lighting device 10 prevents any twisting or entrapment during the rotation and orientation of the lamp housing 13 along the ball-joint structure 12 relative to the supporting structure 11 and the light emitting device 14.

LISTING OF REFERENCE NUMERALS USED

10 directional lighting device
11 supporting structure
11*a* feedthrough opening of supporting structure
11*b* mounting flange of supporting structure
12 ball-joint structure
12*a* feedthrough opening of ball-joint structure
12*b* mounting flange of ball-joint structure
12*z* main axis or source axis of ball-joint structure
120 inner space of ball-joint structure
13 housing
13*a* mounting end of housing
13*b* light exit end of housing
13*c* inner wall of housing
13*d* circumferential slot in inner wall of housing
13*z* longitudinal axis or destination axis of housing
130 inner space of housing
14 light emitting source
15 electric wiring
16 flexible wiring sleeve
16*a*-16*b* first and second sleeve ends of flexible wiring sleeve
17*a*-17*b* coupling ends for flexible wiring sleeve
18 mounting plate for light emitting source
18*a* feedthrough opening of mounting plate
18*b* mounting flange of mounting plate
18*c* circumferential slit of mounting plate
19 retaining spring element
20 tensioning spring element
21 cup-shaped tensioning element
21*a* feedthrough opening of cup-shaped tensioning element
21*b* circumferential slit of cup-shaped tensioning element
21*c* rim of cup-shaped tensioning element
210 inner space of cup-shaped tensioning element
22 bearing ring

The invention claimed is:

1. A directional lighting device comprising:
a supporting structure;
a ball-joint structure mounted to the supporting structure;
a housing configured to accommodate a light emitting source;
electric wiring fed from the supporting structure through the ball-joint structure and electrically connecting the light emitting source;
the ball-joint structure configured to direct the housing relative to the supporting structure and the light emitting source,
wherein the light emitting source is mounted to a mounting plate, wherein the mounting plate has an outer dimension which is smaller than the inner dimension of the housing, and
wherein a cup-shaped tensioning element having an outer dimension which is smaller than the inner dimension of the housing is clamped between the ball-joint structure and the mounting plate.

2. The directional lighting device according to claim 1, wherein the housing is configured as an elongated hollow tube with one tube end being mounted to the ball-joint structure.

3. The directional lighting device according to claim 2, wherein a bearing ring is mounted between the ball joint structure and the inner surface of the one tube end.

4. The directional lighting device according to claim 1, wherein the mounting plate is retained within the housing by means of a retaining spring element, which fits in a circumferential slot provided at the inner circumferential surface of the housing.

5. The directional lighting device according to claim 1, wherein a tensioning spring is mounted between the cup-shaped tensioning element and the mounting plate.

6. The directional lighting device according to claim 5, wherein the cup-shaped tensioning element is provided with a circumferential slit for accommodating the tensioning spring.

7. The directional lighting device according to claim 1, further comprising a flexible wiring sleeve for accommodating the electric wiring, wherein the flexible wiring sleeve has a first sleeve end loosely coupled with the ball-joint structure and a second sleeve end loosely coupled with the mounting plate.

* * * * *